United States Patent
Dell

(10) Patent No.: US 8,142,315 B2
(45) Date of Patent: Mar. 27, 2012

(54) TENSIONER WITH HUB LOAD BALANCING FEATURE

(75) Inventor: James W. Dell, Newmarket (CA)

(73) Assignee: Litens Automotive Partnership, Woodbridge (CA)

( * ) Notice: Subject to any disclaimer, the term of this patent is extended or adjusted under 35 U.S.C. 154(b) by 394 days.

(21) Appl. No.: 12/433,152

(22) Filed: Apr. 30, 2009

(65) Prior Publication Data

US 2009/0275432 A1 Nov. 5, 2009

(51) Int. Cl.
*F16H 7/12* (2006.01)
(52) U.S. Cl. .................................. 474/135; 474/138
(58) Field of Classification Search .......... 474/134–135, 474/137–138
See application file for complete search history.

(56) References Cited

U.S. PATENT DOCUMENTS

| | | | |
|---|---|---|---|
| 4,557,709 A | 12/1985 | St. John | |
| 6,497,632 B2 * | 12/2002 | Ayukawa et al. | 474/135 |
| 6,565,468 B2 | 5/2003 | Serkh | |
| 6,609,988 B1 | 8/2003 | Liu et al. | |
| 6,857,979 B2 | 2/2005 | MacNaughton et al. | |
| 2002/0010044 A1 | 1/2002 | Ayukawa et al. | |
| 2002/0010045 A1 | 1/2002 | Serkh | |
| 2003/0216204 A1 * | 11/2003 | Serkh et al. | 474/135 |
| 2005/0250609 A1 | 11/2005 | Ayukawa et al. | |
| 2006/0100049 A1 * | 5/2006 | Lannutti et al. | 474/133 |
| 2007/0249446 A1 | 10/2007 | Hao et al. | |
| 2008/0194366 A1 | 8/2008 | Mevissen et al. | |
| 2008/0220919 A1 | 9/2008 | Antchak et al. | |
| 2009/0075768 A1 * | 3/2009 | D'Silva et al. | 474/135 |
| 2009/0275432 A1 * | 11/2009 | Dell | 474/135 |
| 2010/0137084 A1 * | 6/2010 | Mevissen et al. | 474/135 |
| 2010/0234155 A1 * | 9/2010 | Antchak et al. | 474/135 |

FOREIGN PATENT DOCUMENTS

JP 62031757 A 2/1987

* cited by examiner

*Primary Examiner* — Sang Kim
(74) *Attorney, Agent, or Firm* — Harness, Dickey & Pierce

(57) ABSTRACT

A tensioner assembly with a drive member, a tensioner arm, a shaft, a pivot bushing, a torsion spring and a load balancing element. The tensioner arm has a hub portion, a drive member mount and an arm disposed therebetween. The drive member is coupled to the drive member mount. The shaft is mounted coaxially within the hub portion. The pivot bushing has a frustoconical bearing surface, which engages a corresponding frustoconical surface in the hub portion, and is slidably mounted on the shaft. The torsion spring is received between the shaft and an outer wall of the hub portion and biases the tensioner arm about the shaft in a predetermined rotational direction. The load balancing element is received between and abuts the outer wall and the torsion spring to transmit a radially outwardly directed force generated by the torsion spring to the outer wall at a predetermined location.

20 Claims, 18 Drawing Sheets

TENSIONER WITH HUB LOAD BALANCING FEATURE

INTRODUCTION

The present disclosure generally relates to power transmitting systems that employ an endless power transmitting element. More particularly, the present disclosure relates to a tensioner for tensioning an endless power transmitting element in a power transmitting system that is configured to apply a force on a tensioner arm to counter-act a tilting moment that acts on a bushing that supports the tensioner arm.

U.S. Provisional Patent Application Ser. No. 60/915,218 entitled "Wear Compensated Tensioner" filed May 1, 2007 discloses a tensioner assembly that employs a frustoconical pivot bushing to control the location of a tensioner arm relative to a shaft. While such configuration is highly suitable for tensioner assemblies in which a driven member (e.g., a pulley or a sprocket) is disposed in-line with the pivot bushing but may not be suitable in some situations where the tensioner assembly has a pulley-over-arm configuration. More specifically, the pulley-over-arm configuration causes a moment to be applied to the tensioner assembly that can cause uneven wear on the pivot bushing under some circumstances which could ultimately result in misalignment of the drive member. Accordingly, there is a need in the art for an improved tensioner assembly.

SUMMARY

In one form, the present teachings provide a tensioner assembly for tensioning an endless power transmitting element. The tensioner assembly can include a base plate, a shaft, a pivot bushing, a tensioner arm, a torsion spring, a driven member and a load balancing element. The shaft has a first end that is mounted to the base plate. The pivot bushing is slidably received on the shaft. The tensioner arm includes a hub portion, a mount and an arm. The hub portion is coupled to a first end of the arm and the mount is coupled to a second end of the arm. The hub portion engages the pivot bushing. The torsion spring has a first end, a second end and a plurality of coils. The first end engages the base plate and the second end biases the tensioner arm in a predetermined direction relative to the base plate. The driven member is coupled to the mount of the tensioner arm. The load balancing element is disposed between an interior surface of the hub portion and the torsion spring. The load balancing element is driven into the hub portion at a predetermined location to transmit a radially outwardly directed force, which is generated by the torsion spring, to the hub.

In another form, the teachings of the present disclosure provide a tensioner assembly for tensioning an endless power transmitting element. The tensioner assembly can include a drive member, a tensioner arm, a shaft, a pivot bushing, a torsion spring and a load balancing element. The tensioner arm has a hub portion, an arm and a drive member mount. The drive member is coupled to the drive member mount on a side of the arm opposite the hub portion such that the tensioner assembly has a drive member-over-arm configuration. The shaft is mounted coaxially within the hub portion. The pivot bushing has a frustoconical bearing surface and is slidably mounted on the shaft. The frustoconical bearing surface engages a corresponding frustoconical surface in the hub portion. The torsion spring is received between the shaft and an outer wall of the hub portion and biases the tensioner arm about the shaft in a predetermined rotational direction. The load balancing element is received between the outer wall of the hub portion and the torsion spring. The load balancing element abuts the outer wall and the torsion spring to transmit a radially outwardly directed force generated by the torsion spring to the outer wall at a predetermined location.

Further areas of applicability will become apparent from the description provided herein. It should be understood that the description and specific examples are intended for purposes of illustration only and are not intended to limit the scope of the present disclosure, its application and/or uses in any way.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

DETAILED DESCRIPTION OF THE VARIOUS EMBODIMENTS

Figure 1:
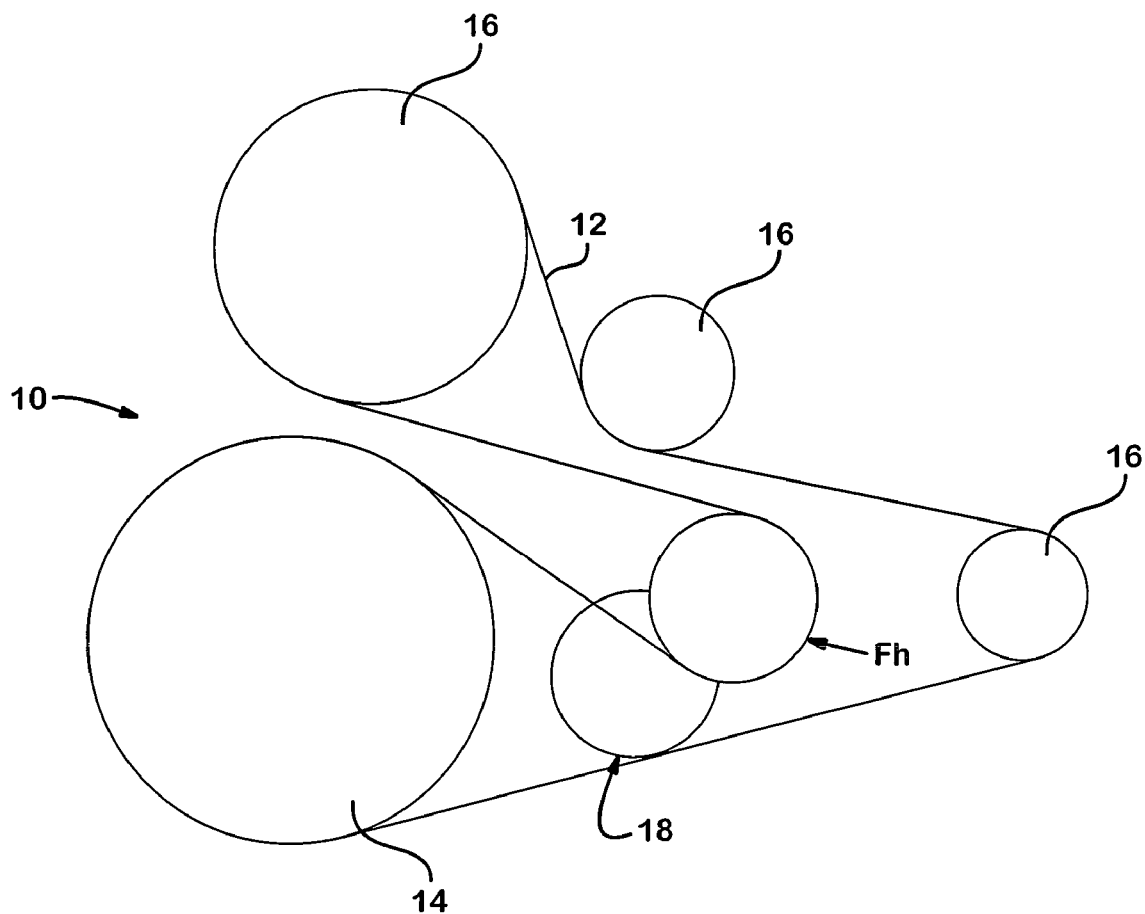
FIG. 1 is a schematic illustration of an exemplary power transmitting system (PTS) constructed in accordance with the teachings of the present disclosure.

With reference to FIG. 1 of the drawings, a power transmitting system constructed in accordance with the teachings of the present invention is generally indicated by reference numeral 10. The power transmitting system (PTS) 10 can include an endless power transmitting element (EPTE) 12, a drive member 14 that transmits power to the EPTE 12, one or more driven members 16 that can be driven (rotated) by the EPTE 12 and a tensioner assembly 18 that can be configured to tension the EPTE 12 by a predetermined amount. In the particular example provided, the EPTE 12 is a belt, while the drive member 14 and the driven members 16 are pulleys, but those of skill in the art will appreciate that the EPTE 12 could be a chain and that the drive member 14 and the driven members 16 could include sprockets. The drive member 14 can be driven by an appropriate power source, such as an electric motor or an internal combustion engine (not shown), while the driven members 16 can be employed to transmit power from the EPTE 12 and/or to change a direction of the EPTE 12. In the example provided, the PTS 10 is associated with an automotive vehicle (not shown), the drive member 14 is coupled for rotation with an engine crankshaft (not shown) and the driven members 16 are associated with various vehicle components such as an alternator, a water pump, a power steering pump, an air conditioning compressor, a fan and/or an idler (not shown).

Figure 2:
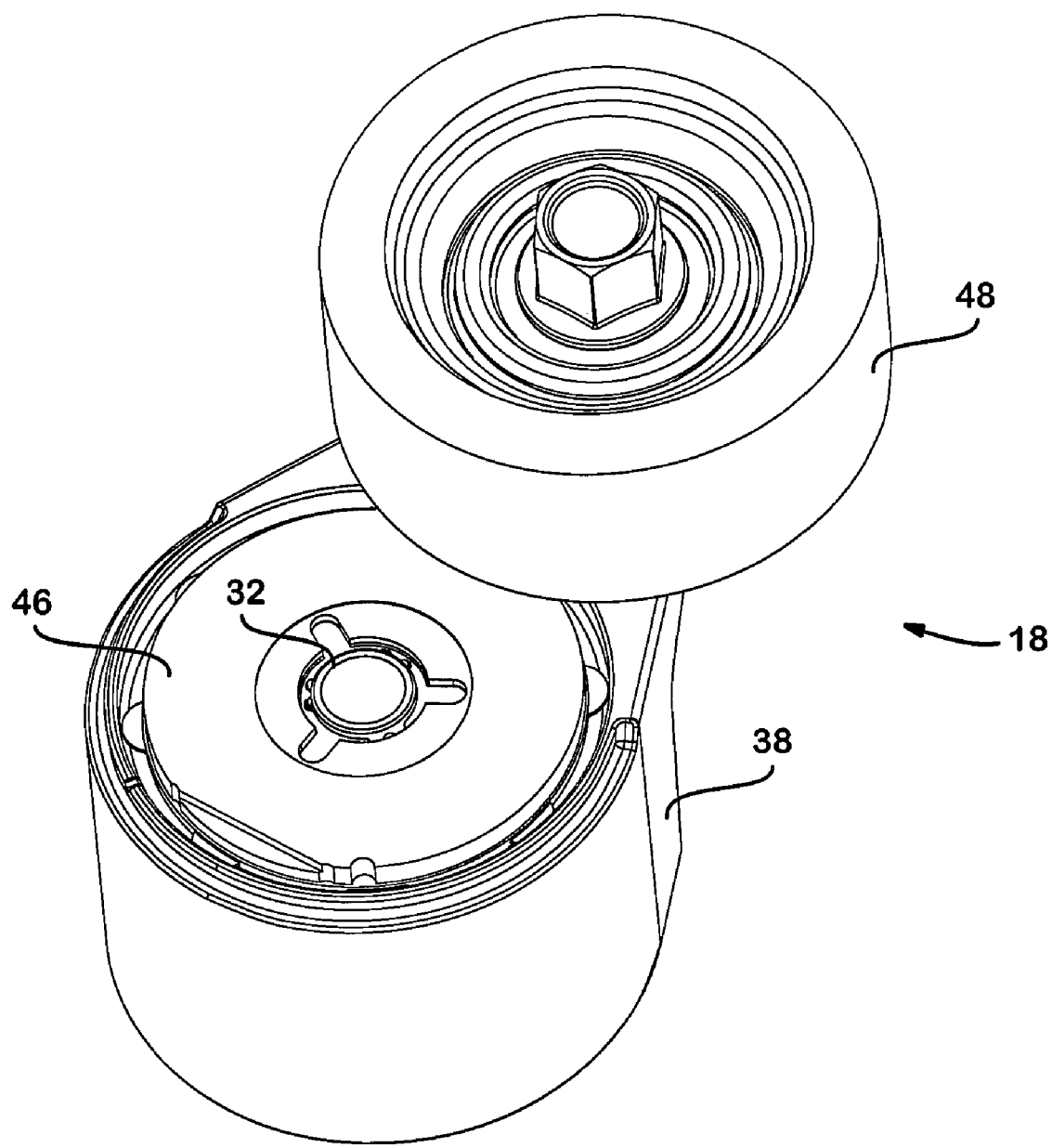
FIG. 2 is a perspective view of a portion of the PTS of FIG. 1, illustrating the tensioner assembly in more detail.
Figure 3:
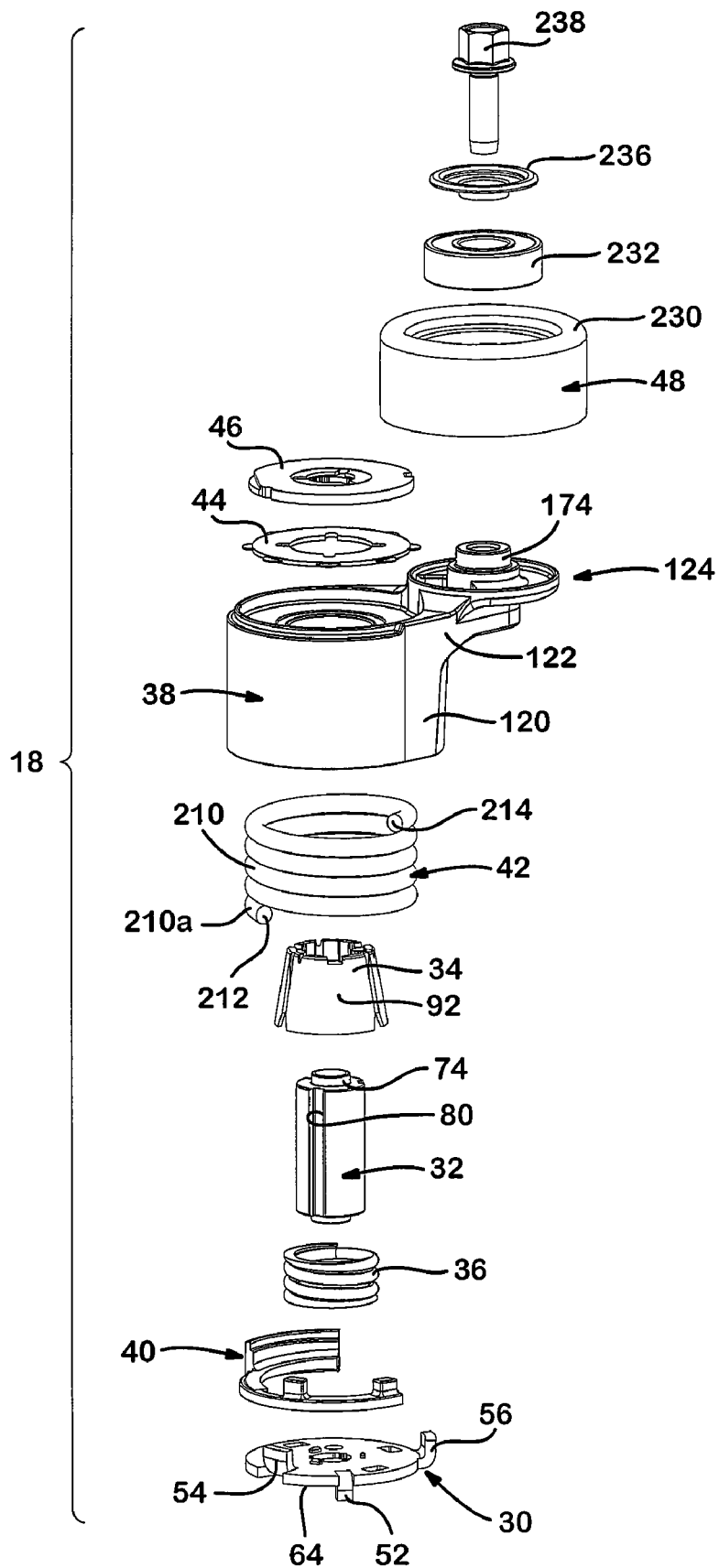
FIG. 3 is an exploded perspective view of the tensioner assembly.
Figure 4A:
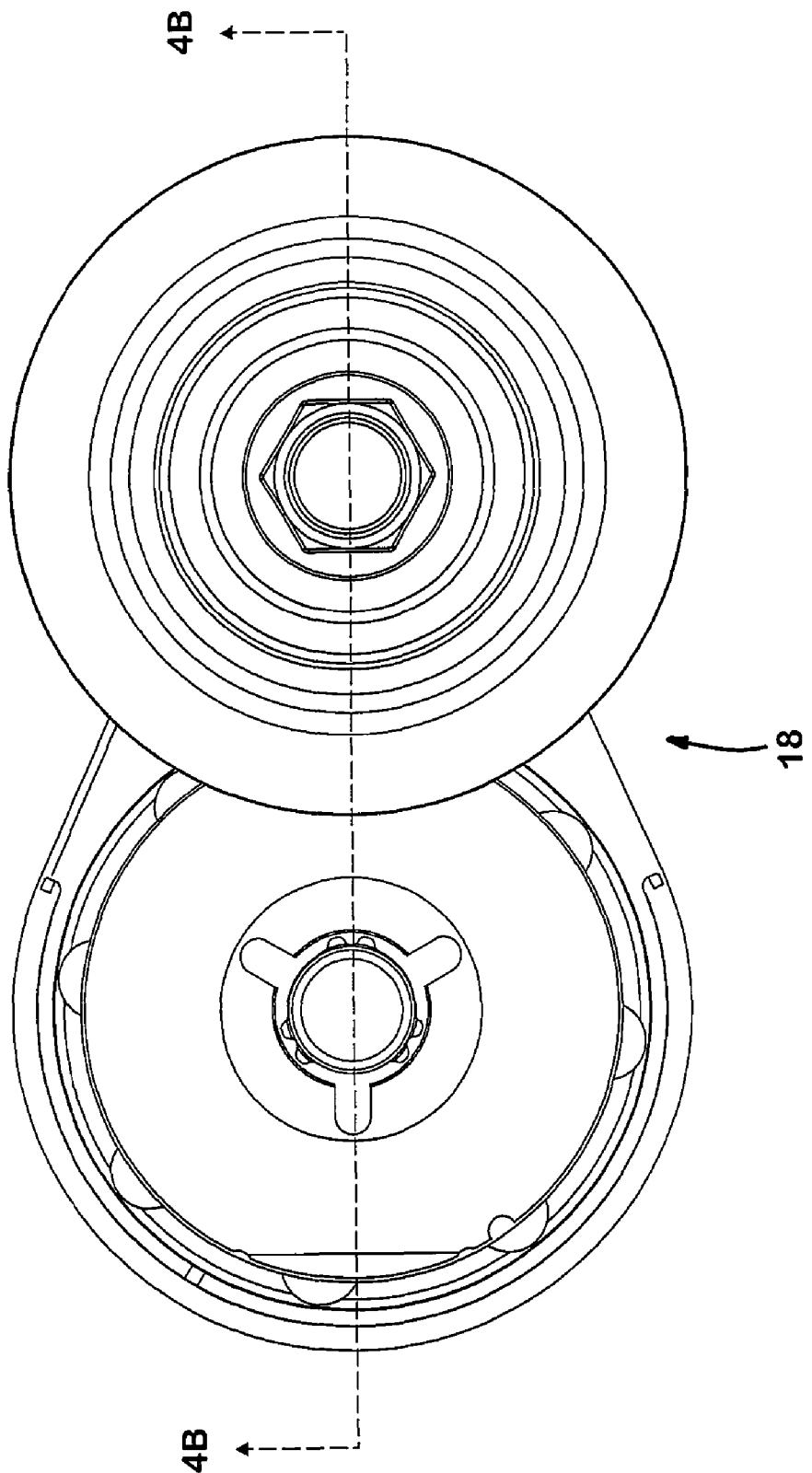
FIG. 4A is a top plan view of the tensioner assembly.

With reference to FIGS. 2 through 4, the tensioner assembly 18 can include a rear plate 30, a shaft 32, a pivot bushing 34, a bushing spring 36, a tensioner arm 38, a load balancing element (LBE) 40, a torsion spring 42, a thrust washer 44, a top plate 46 and a drive member 48.

Figure 5:
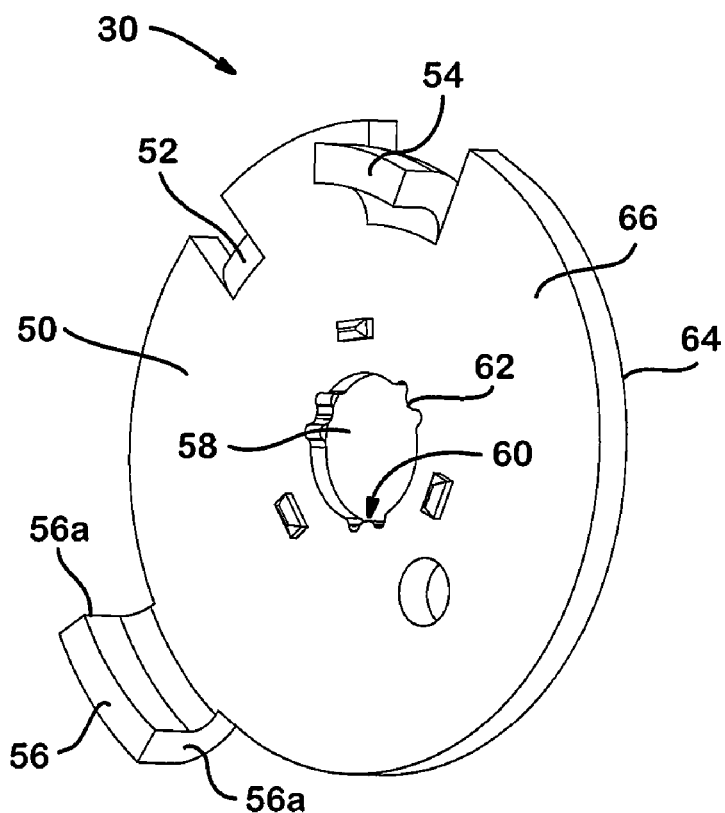
FIG. 5 is a top plan view of a portion of the tensioner assembly, illustrating the rear plate in more detail.

With reference to FIGS. 3 and 5, the rear plate 30 can be a stamped steel structure and can include a back member 50, a locating feature 52, a spring reaction member 54 and an arm stop member 56. The back member 50 can include an aperture 58 and one or more locating or locking features 60 that can be disposed about the aperture 58. In the example provided, the locking features 60 comprise tabs 62 that are spaced circumferentially about the aperture 58. The locating feature 52 can extend from a rear side 64 of the rear plate 30 and can be received into an aperture (not shown) in a structure (not shown) to which the tensioner assembly 18 is to be coupled. The locating feature 52 can be employed to resist rotation of the tensioner assembly 18 relative to the structure to which the tensioner assembly 18 is to be coupled and/or to index the tensioner assembly 18 in a predetermined orientation relative to the structure. The spring reaction member 54 and the arm stop member 56 can be tab-like structures that can be coupled to the rear plate 30 so as to extend generally perpendicular from a front side 66 of the back member 50.

Figure 6:
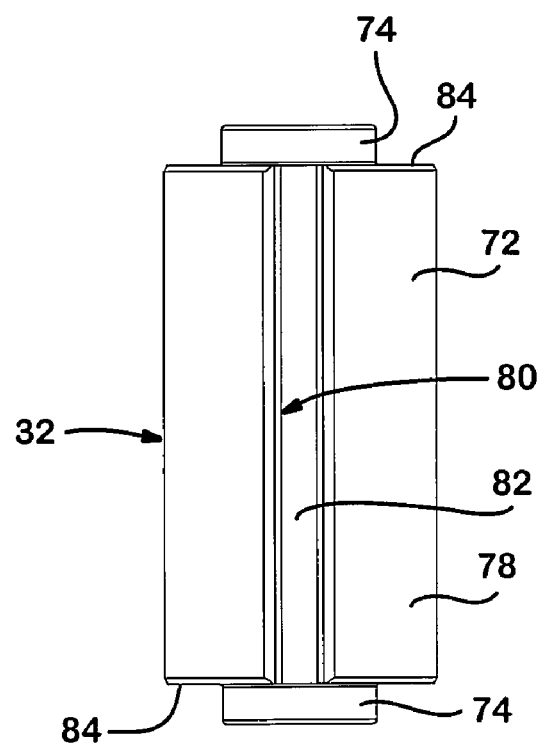
FIG. 6 is a side elevation view of a portion of the tensioner assembly illustrating the shaft in more detail.

With reference to FIGS. 3, 4 and 6, the shaft 32 can be a hollow shaft having a center-bore 70, a body 72 and a pair of necked-down ends 74. The shaft 32 can be formed in any desired manner, such as via extrusion, rolling, turning and combinations thereof if a solid bar-stock is employed, via compacting and sintering if a powdered metal is employed, or injection or diecast molding if a plastic, aluminum or magnesium material is employed. The center-bore 70 can extend longitudinally through the shaft 32 and can be shaped in any desired manner. The body 72 can define an outer peripheral surface 78 and one or more first anti-rotation features 80. In its most basic form, the one or more first anti-rotation features 80 can include a non-circular cross-sectional shape of the outer peripheral surface 78. In the particular example provided, however, the body 72 defines three equally spaced-apart first anti-rotation features 80 and each of the first anti-rotation features 80 is a longitudinally extending groove 82 that intersects the outer peripheral surface 78. The necked-down ends 74 can cooperate with the body 72 to define a shoulder 84. A first one of the necked-down ends 74 can be received in the aperture 58 in the rear plate 30 and the corresponding shoulder 84 abutted against the front side 66 of the back member 50. Each of the tabs 62 (FIG. 5) can be received into a corresponding one of the grooves 82 to rotationally lock the rear plate 30 to the shaft 32. The shaft 32 and the rear plate 30 can be fixedly coupled to one another via any appropriate means, such as staking.

Figure 7:
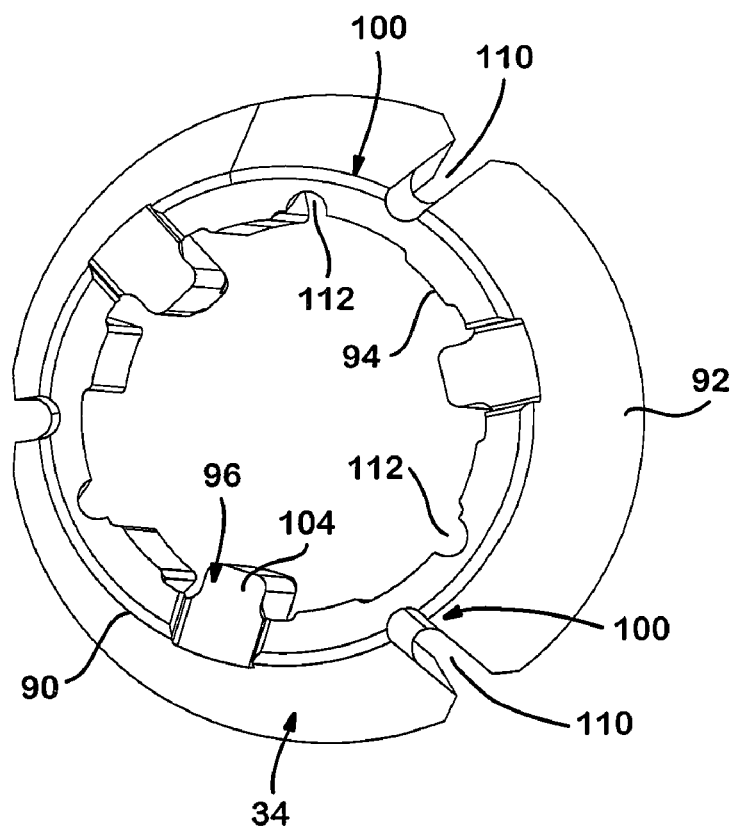
FIG. 7 is a perspective view of a portion of the tensioner assembly illustrating the pivot bushing in more detail.
Figure 8:
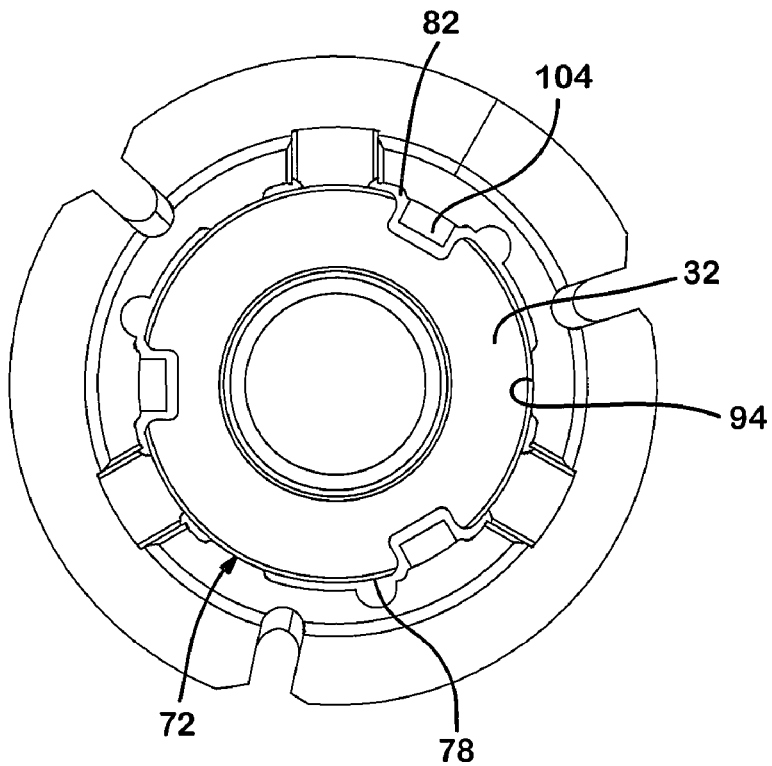
FIG. 8 is a bottom plan view of a portion of the tensioner assembly illustrating the pivot bushing installed over the shaft.

With reference to FIGS. 3, 7 and 8, the pivot bushing 34 can be formed of an appropriate material, such as an engineering Nylon 4/6 (such as Stanyl® TW363) and can be formed via injection molding or another suitable process. The pivot bushing 34 can include an annular, unbroken (i.e., continuously extending) wall member 90 that can define an outer bushing surface 92, an inner bushing surface 94, one or more second anti-rotation features 96 and one or more deformable portions 100. The outer bushing surface 92 can be generally frusto-conical in shape. The inner bushing surface 94 can be sized to be slidingly received on the outer peripheral surface 78 of the body 72 of the shaft 32. The one or more second anti-rotation features 96 can cooperate with the one or more first anti-rotation features 80 to inhibit rotation of the pivot bushing 34 relative to the shaft 32. Where the one or more first anti-rotation features 80 include a non-circular cross-sectional shape of the outer peripheral surface 78, the one or more second anti-rotation features 96 can include a corresponding or mating shape of the inner bushing surface 94 In the particular example provided, the one or more second anti-rotation features 96 comprise a plurality of inwardly extending tabs 104 that are configured to be received into the longitudinally extending grooves 82 in the body 72 of the shaft 32.

Figure 21:
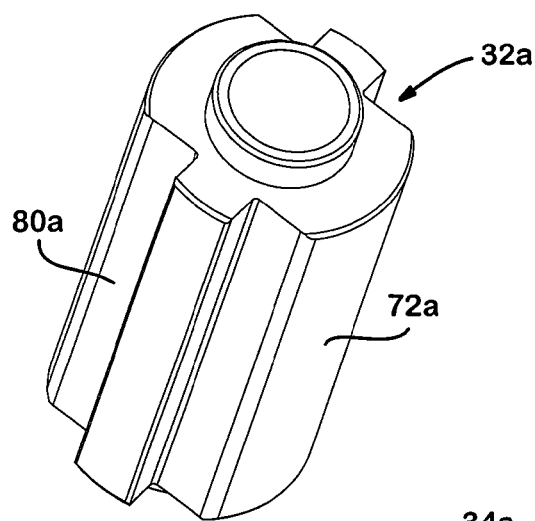
FIG. 21 is a perspective view of another shaft having an alternatively configured set of first anti-rotation features.
Figure 22:
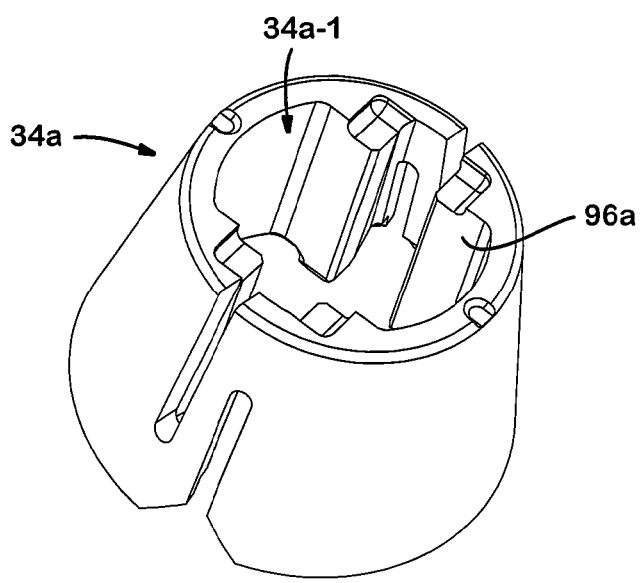
FIG. 22 is a perspective view of another pivot bushing having an alternatively configured set of second anti-rotation features.
Figure 23:
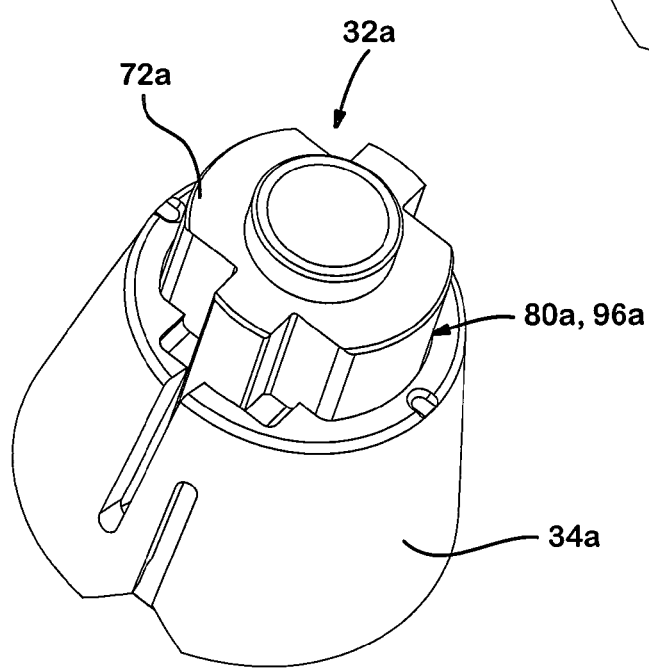
FIG. 23 is a perspective view of the shaft and pivot bushing of FIGS. 21 and 22, respectively, coupled to one another with the first and second anti-rotation features engaged to one another.

Another example is illustrated in FIGS. 21 through 23 in which the first anti-rotation features 80a comprise a generally cruciform cross-sectional shape of the body 72a of the shaft 32a, while the second anti-rotation features 96a comprise an interior aperture 34a-1 in the pivot bushing 34a. The interior aperture 34a-1 is shaped correspondingly to the body 72a and sized to permit relative axial sliding of the pivot bushing 34a on the shaft 32a but to resist relative rotation between the pivot bushing 34a and the shaft 32a. Configuration in this latter manner may facilitate a relatively smaller degree of rotational "play" between the shaft 32a and the pivot bushing 34a as compared to the groove-and-tab arrangement described above without need for relatively tight tolerances on the first and second anti-rotation features 80a and 96a.

Returning to FIGS. 3, 7 and 8, each of the one or more deformable portions 100 can be formed by a narrowing of the wall member 90 and can be configured to permit the frusto-conical outer bushing surface 92 of the pivot bushing 34 to expand radially outwardly and/or contract radially inwardly. In the particular example provided the narrowing of wall member 90 is formed by a pair of slots 110, 112. The slots 110, 112 can be disposed in various different orientations, such as parallel to one another and optionally parallel to a longitudinal axis of the shaft 32 or parallel to the outer bushing surface 92.

In FIGS. 3 and 4, the bushing spring 36 can be a compression spring that can be received onto the shaft 32 between the rear plate 30 and the pivot bushing 34. The bushing spring 36 is configured to urge the pivot bushing 34 into contact with the tensioner arm 38 as will be described in greater detail, below, to both guide the tensioner arm 38 as it pivots about the shaft 32 as well as to provide a desired level of damping. Those of skill in the art will appreciate from this disclosure that the bushing spring 36 can be selected to provide a desired level of damping.

Figure 9:
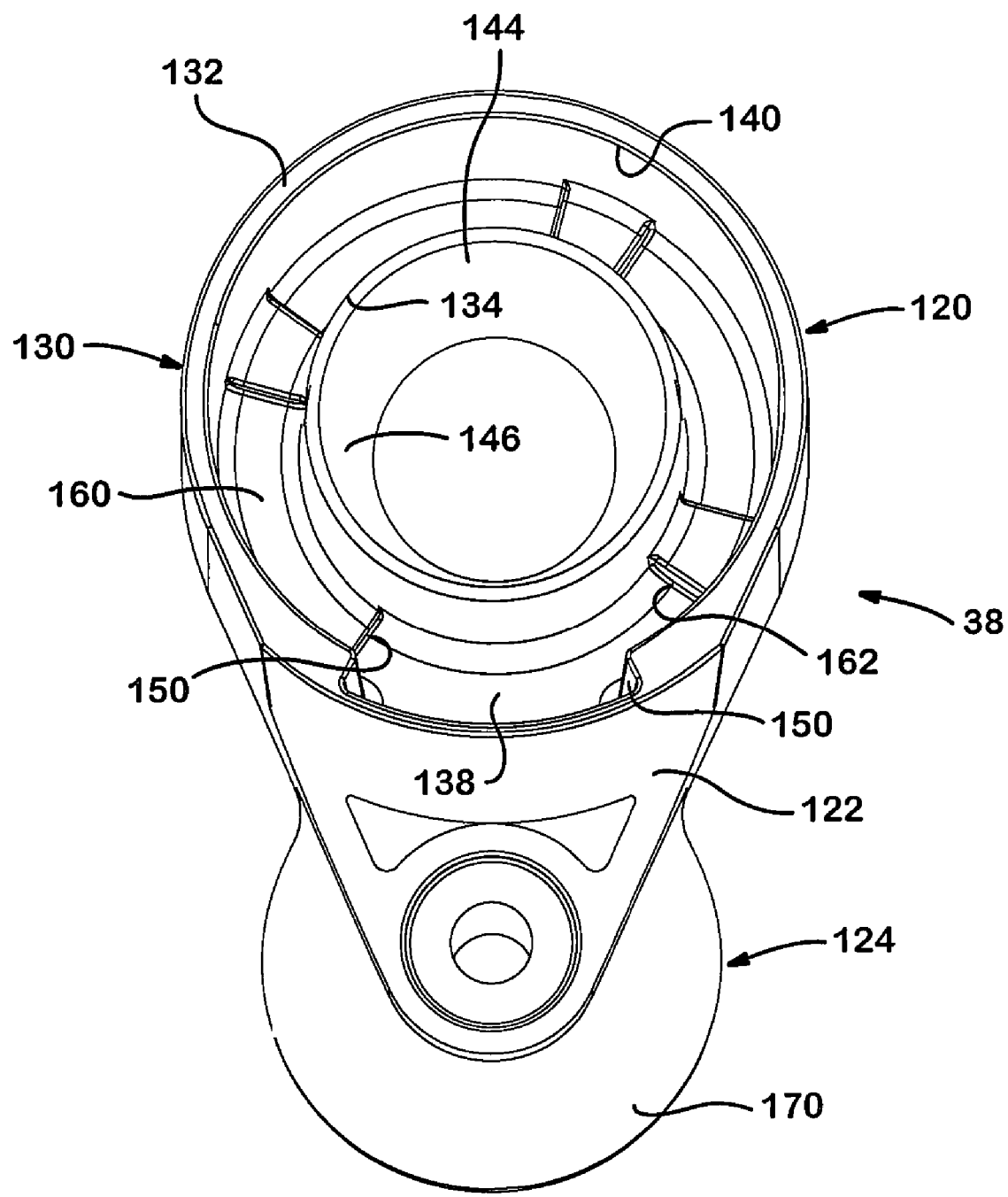
FIG. 9 is a bottom perspective view of a portion of the tensioner assembly illustrating the tensioner arm in more detail.
Figure 10:
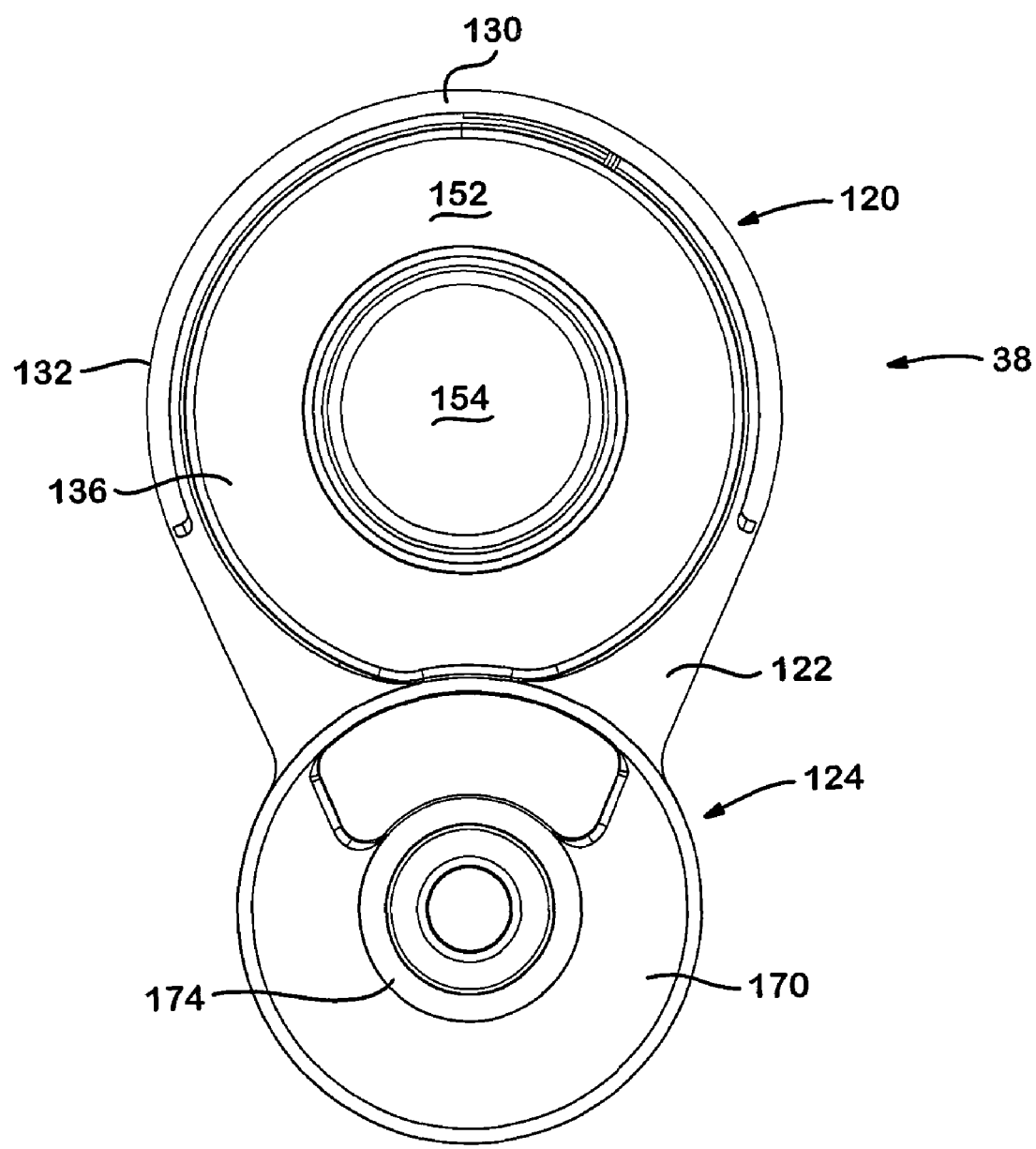
FIG. 10 is a top plan view of the tensioner arm.

With additional reference to FIGS. 9 and 10, the tensioner arm 38 can be integrally formed in a suitable process, such as machining, casting (including die casting) or injection molding, and can include a hub portion 120, an arm 122 and a drive member mount 124. The hub portion 120 can include an annular wall member 130 with an outer wall 132, an inner wall 134 and a top wall 136. The outer wall 132 can include a stop recess 138, which is configured to receive the arm stop member 56 of the rear plate 30 therein, and a reaction surface 140 that will be discussed in more detail below. The inner wall 134 can define a bushing mount 144 with a frustoconical mount surface 146 that is configured to matingly engage the outer bushing surface 92 of the pivot bushing 34 to permit the tensioner arm 38 to pivot about the shaft 32. Contact between the opposite lateral sides 56a (FIG. 5) of the arm stop member 56 and the associated side edges 150 of the stop recess 138 can limit an amount by which the tensioner arm 38 is permitted to pivot about the shaft 32. The top wall 136 can include a recess 152 and an aperture 154. The recess 152 can be configured to receive the thrust washer 44 and the top plate 46 as will be described below in more detail. An internal annular space 160 between the outer wall 132 and the inner wall 134 can be configured to receive the torsion spring 42. In the example provided a reaction member 162 can be formed by or coupled to the wall member 130 in the internal annular space 160 for engaging the torsion spring 42 as will be described in more detail below. The arm 122 can be disposed between and fixedly couple the hub portion 120 to the drive member mount 124. The drive member mount 124 can include a plate structure 170 and a hub 174 onto which the drive member 48 can be mounted. The hub 174 can be disposed on a side of the tensioner arm 38 opposite the hub portion 120 (i.e., the tensioner assembly 18 can have a "pulley-over-arm" configuration).

While not shown, it will be appreciated that an appropriately sized lug or aperture, such as a ½ or ⅜ inch square aperture, could be formed in the tensioner arm 38 to accommodate a tool (not shown) that can be employed to pivot the tensioner arm 38 about the shaft 32 for installation of the EPTE 12 (FIG. 1) to the PTS 10 (FIG. 1).

Figure 4B:
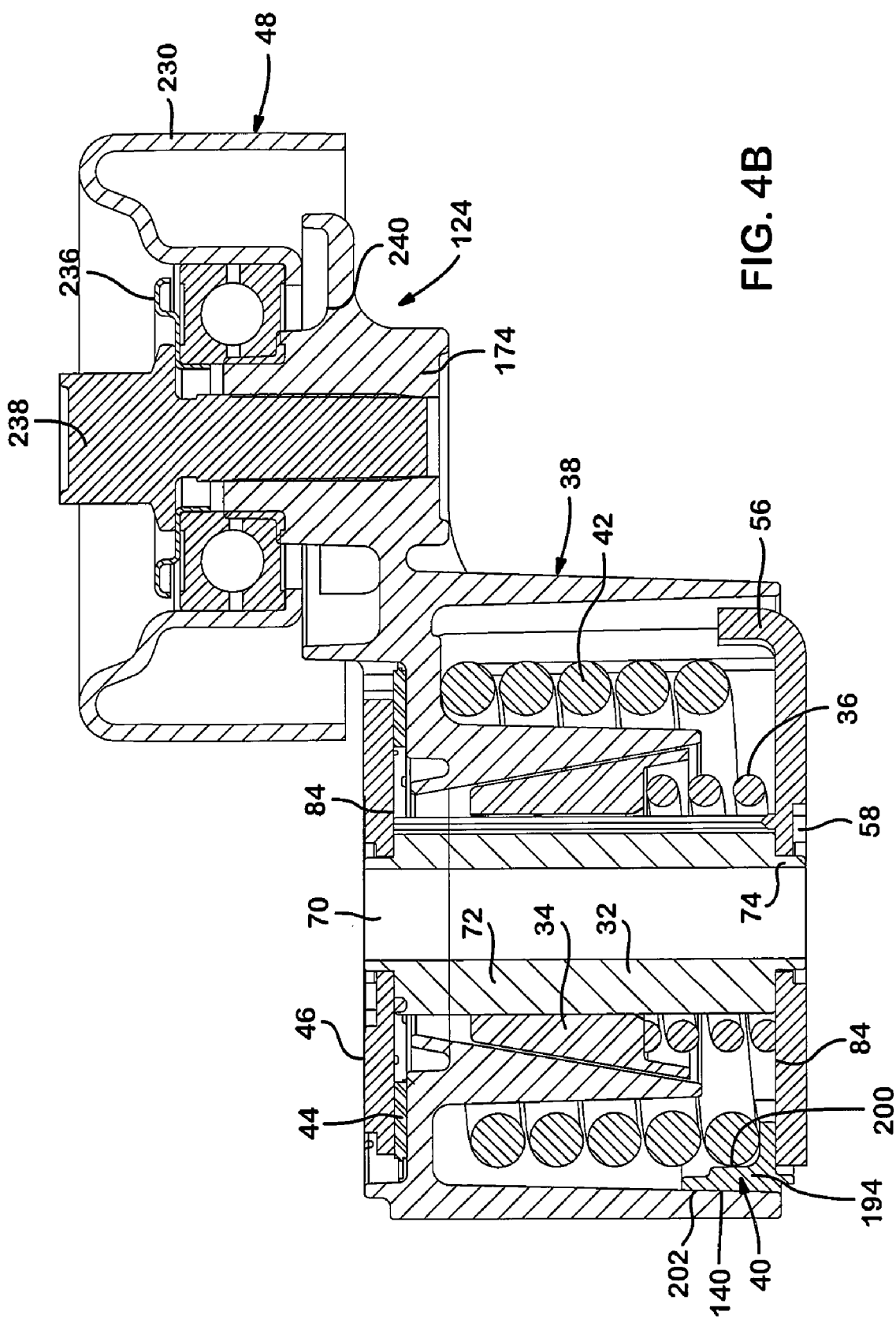
FIG. 4B is a sectional view to the tensioner assembly taken along the line 4B-4B of FIG. 4A.
Figure 11:
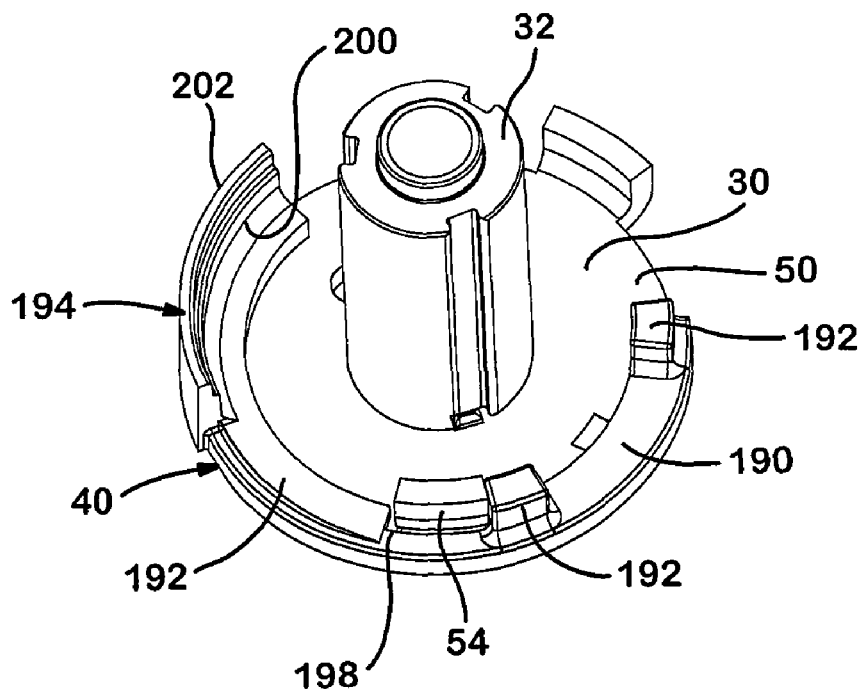
FIG. 11 is a perspective view of a portion of the tensioner assembly illustrating the shaft and load balancing element as coupled to the rear plate.
Figure 13:
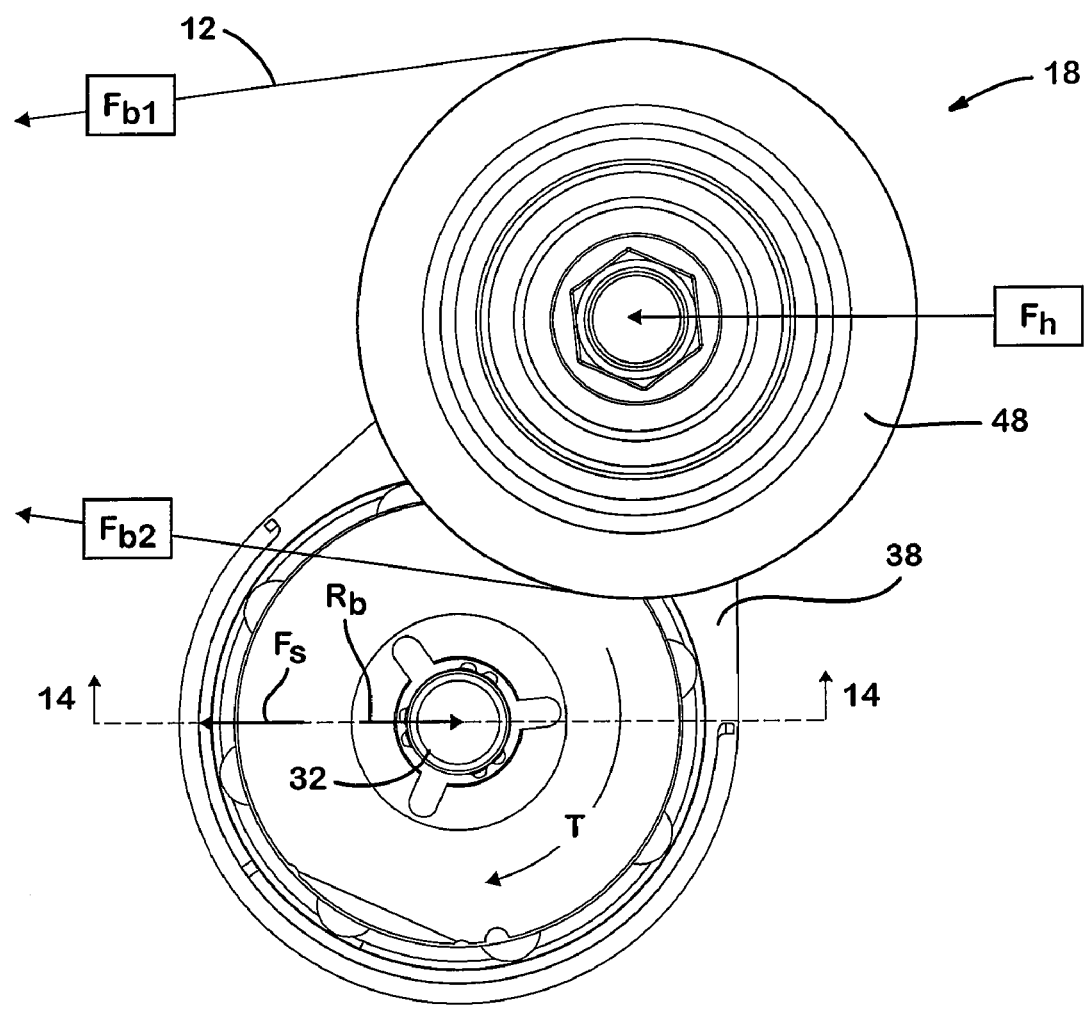
FIG. 13 is a top plan view of a portion of the PTS schematically illustrating various forces and moments acting on the tensioner arm of the tensioner assembly.
Figure 14:
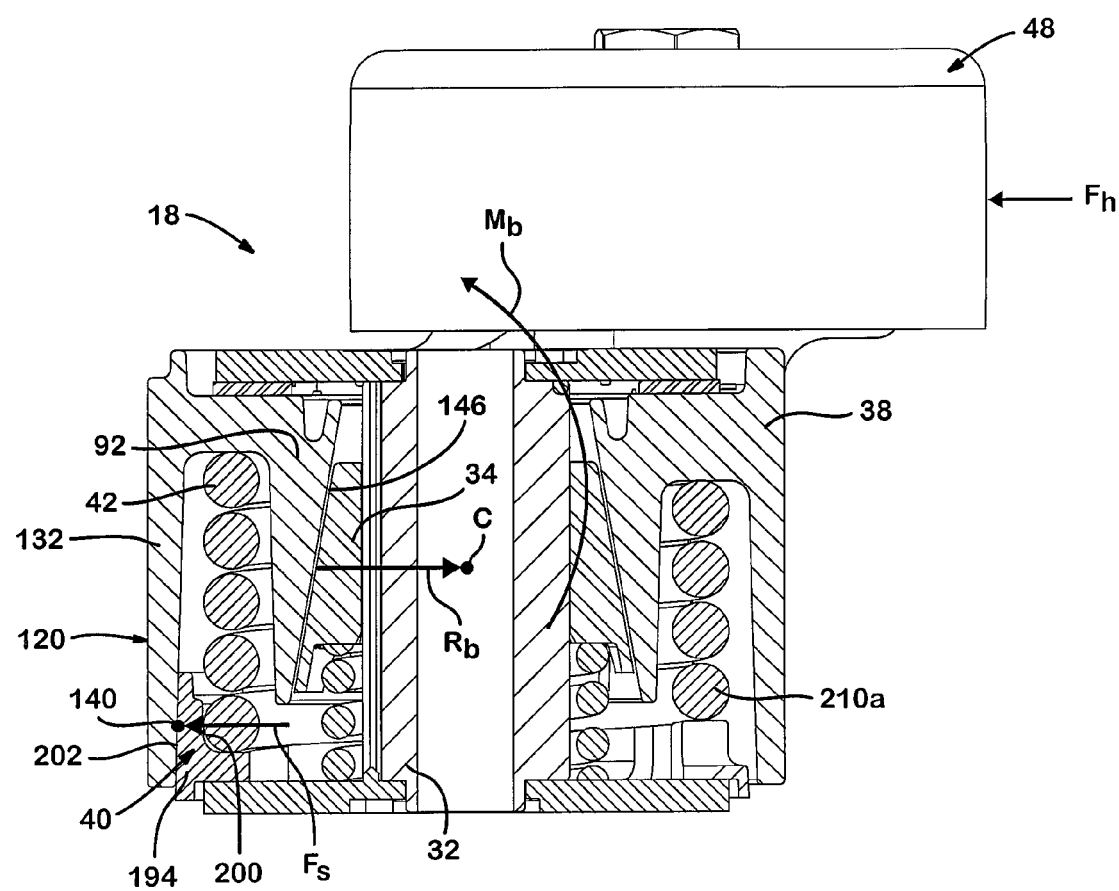
FIG. 14 is a cross-sectional view of the tensioner assembly illustrating various forces and moments acting on the tensioner arm of the tensioner assembly.

With reference to FIGS. 3, 4B and 11, the LBE 40 can be formed of a suitable material, such Nylon (e.g., Stanyl® TW363) and can have a body 190, a plurality of spring support lugs 192 and a reaction flange 194 (the reaction flange 194 is shown out of position in FIG. 4B for purposes of illustration and would not otherwise be visible—see FIGS. 13 and 14 for a more precise location of the reaction flange 194). The body 190 can be generally C-shaped having an outer diameter that is about equal to the outer diameter of the back member 50 of the rear plate 30. The body 190 can include a notch 198 that is configured to be received about the spring reaction member 54. In this regard, the spring reaction member 54 can locate the LBE 40 in a predetermined orientation relative to the rear plate 30. The spring support lugs 192 can be coupled to the body 190 and can be employed to support the torsion spring 42 at desired locations. The reaction flange 194 can be coupled to an end of the body 190 and can include an arcuate inner face 200 and an arcuate outer face 202.

Figure 12:
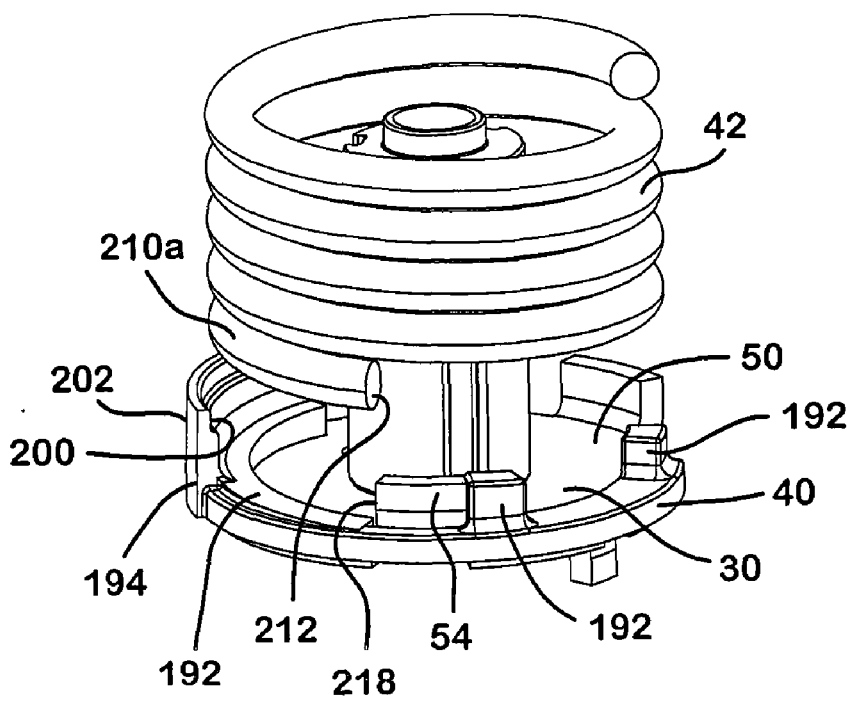
FIG. 12 is an exploded perspective view of a portion of the tensioner assembly illustrating the torsion spring exploded from the rear plate and load balancing element.

With reference to FIGS. 3 and 12, the torsion spring 42 can be a helical coil spring that can be configured to open as the torsion load on the torsion spring 42 increases. The torsion spring 42 can have a plurality of helical coils 210 with a first cut end 212 and a second cut end 214 opposite the first cut end 212. The torsion spring 42 can be received over the shaft 32 and pivot bushing 34 and onto the back member 50 such that the first cut end 212 can be engaged against an end face 218 of the spring reaction member 54 (FIG. 9) while the second cut end 214 is engaged against the reaction member 162 on the hub portion 120 of the tensioner arm 38. The first helical coil 210a, which can be disposed proximate the rear plate 30, can be received in the reaction flange 194 proximate the arcuate inner face 200 and can be supported on its bottom by the spring support lugs 192. It will be appreciated that the height of each of the spring support lugs 192 will vary to accommodate the helix along which the first helical coil 210a is formed.

With reference to FIGS. 3 and 4, the thrust washer 44 can be formed of a suitable material, such as Nylon, and can be received over the shaft 32 and in the recess 152 in the top wall 136 of the hub portion 120 of the tensioner arm 38. The top plate 46 can be an annular plate member that can be fitted onto the necked-down portion 74 of the shaft 32 and abutted against the shoulder 84 that is opposite the rear plate 30. The top plate 46 can be fixedly coupled to the shaft 32 via any appropriate method, including staking.

The drive member 48 can include a pulley 230 and a bearing 232 that can be received into the pulley 230. In the particular example provided, a washer 236 and a threaded fastener 238 can be employed to fixedly couple an inner bearing race 240 of the bearing 232 to the hub 174 of the drive member mount 124. More specifically, the hub 174 can include a threaded aperture—into which the threaded fastener 238 may be threadably received.

With reference to FIGS. 13 and 14, the torsion spring 42 can bias the tensioner arm 38 in a direction about the shaft 32 such that the drive member 48 tensions the EPTE 12. Stated another way, the torsion spring 42 applies a torque T to the tensioner assembly 18 about the longitudinal axis of the shaft 32. As the tensioner assembly 18 has a pulley-over-arm configuration, the load applied through the EPTE 12 to the drive member 48 is transmitted to the tensioner arm 38 at a location that is offset from the location of the centroid of the pivot bushing 34, causing a first moment Mb to be applied to the tensioner arm 38. In this regard, the EPTE 12 applies forces Fb1 and Fb2 to the drive member 48, and these forces combine to produce a force Fh that is exerted through the bearing 232 onto the hub 174. The pivot bushing 34 cooperates with the tensioner arm 38 to produce a reaction force Rb that counteracts the force Fh. The forces Rb and Fh, however, are spaced apart from one another such that the moment Mb is created To counter-act the first moment Mb, the torsion spring 42 can react against the arcuate inner face 200 of the reaction flange 194, causing the body 190 (FIG. 11) to flex such that the arcuate outer face 202 contacts the reaction surface 140 on the outer wall 132 of the hub portion 120 of the tensioner arm 38. Accordingly, a radially outwardly directed force Fs applied by the first coil 210a as the torsion spring 42 opens is applied through the LBE 40 to the hub portion 120. It will be appreciated that the radially outwardly directed force Fs of the torsion spring 42 is transmitted to the hub portion 120 of the tensioner arm 38 in a predetermined direction (i.e., in-line with the load Fh) and at an offset from the centroid of the pivot bushing 34 such that the predetermined direction is configured to produce a counter-acting second moment that can substantially reduce if not eliminate the first moment.

Figure 15:
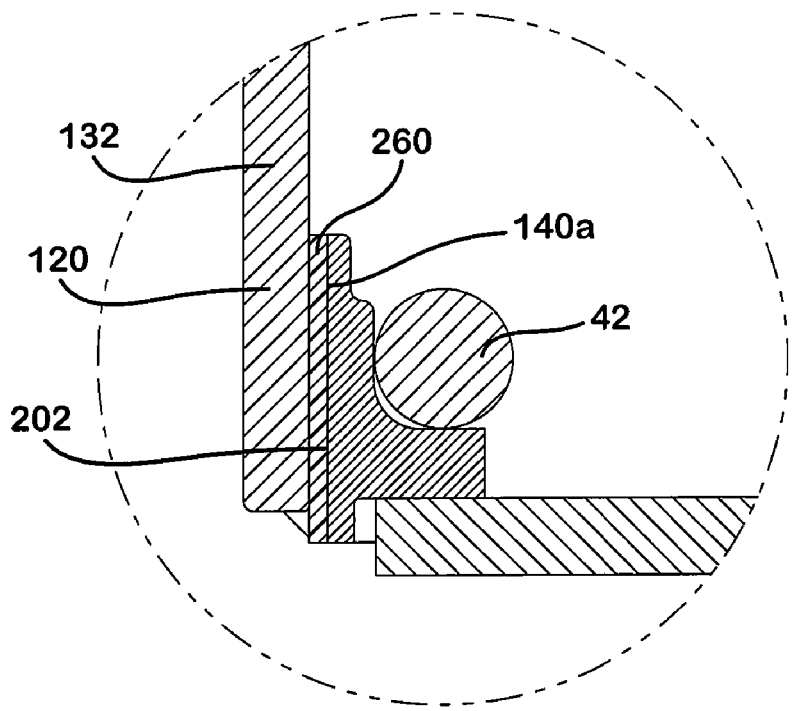
FIGS. 15 and 16 are cross-sectional views of various other tensioner assemblies constructed in accordance with the teachings of the present disclosure.
Figure 16:
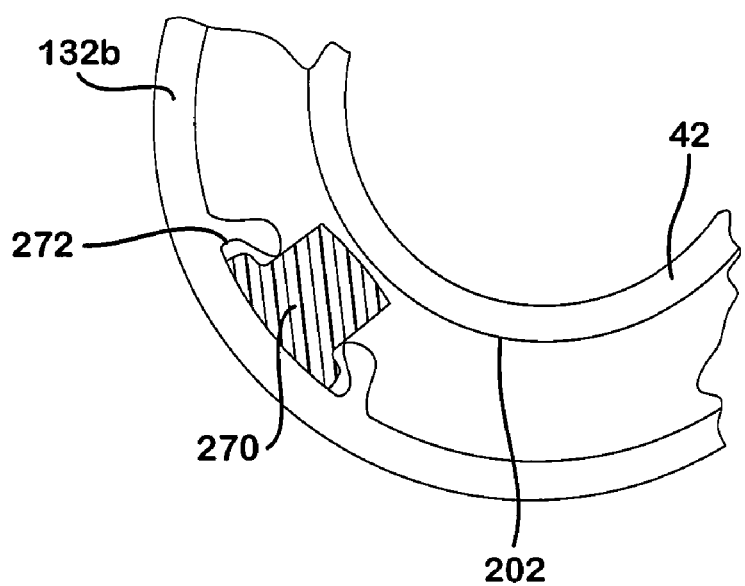
Figure 17:
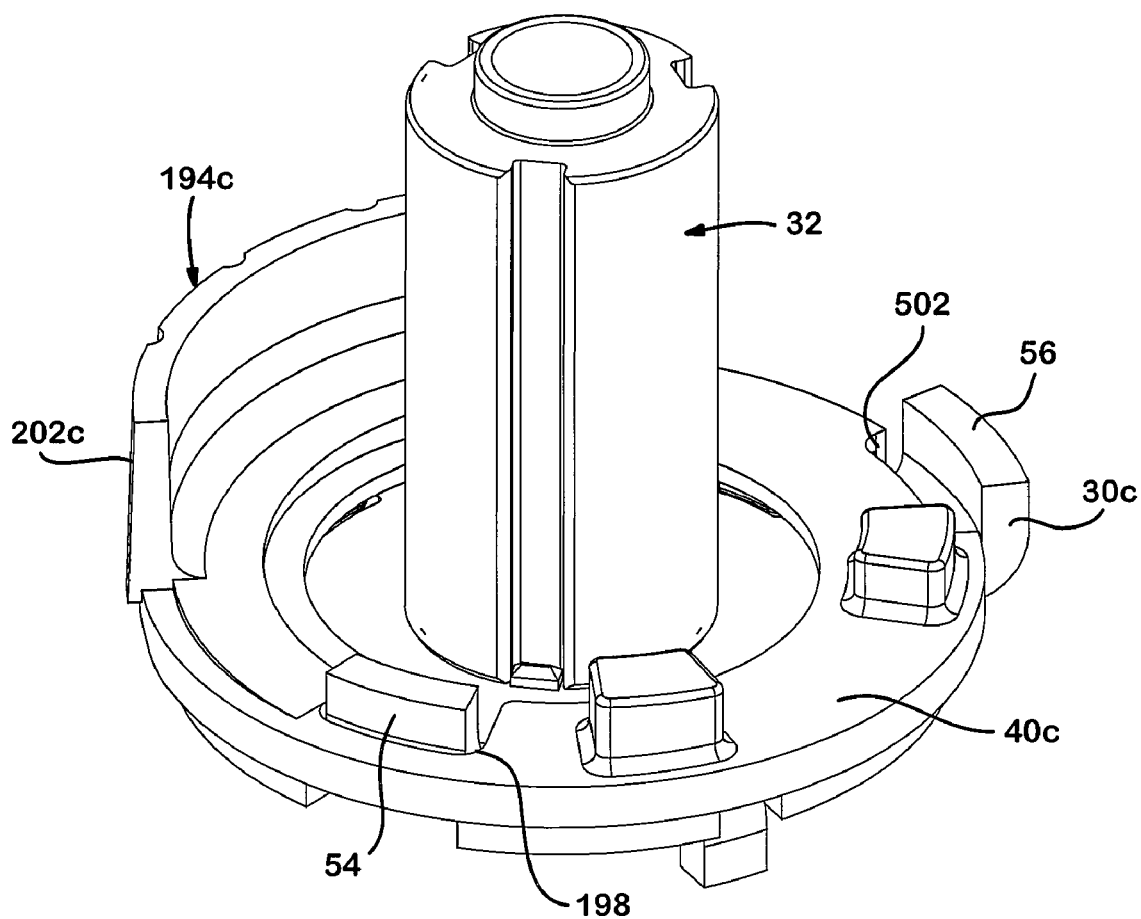
FIG. 17 is a front perspective view of a portion of another tensioner assembly constructed in accordance with the teachings of the present disclosure.
Figure 18:
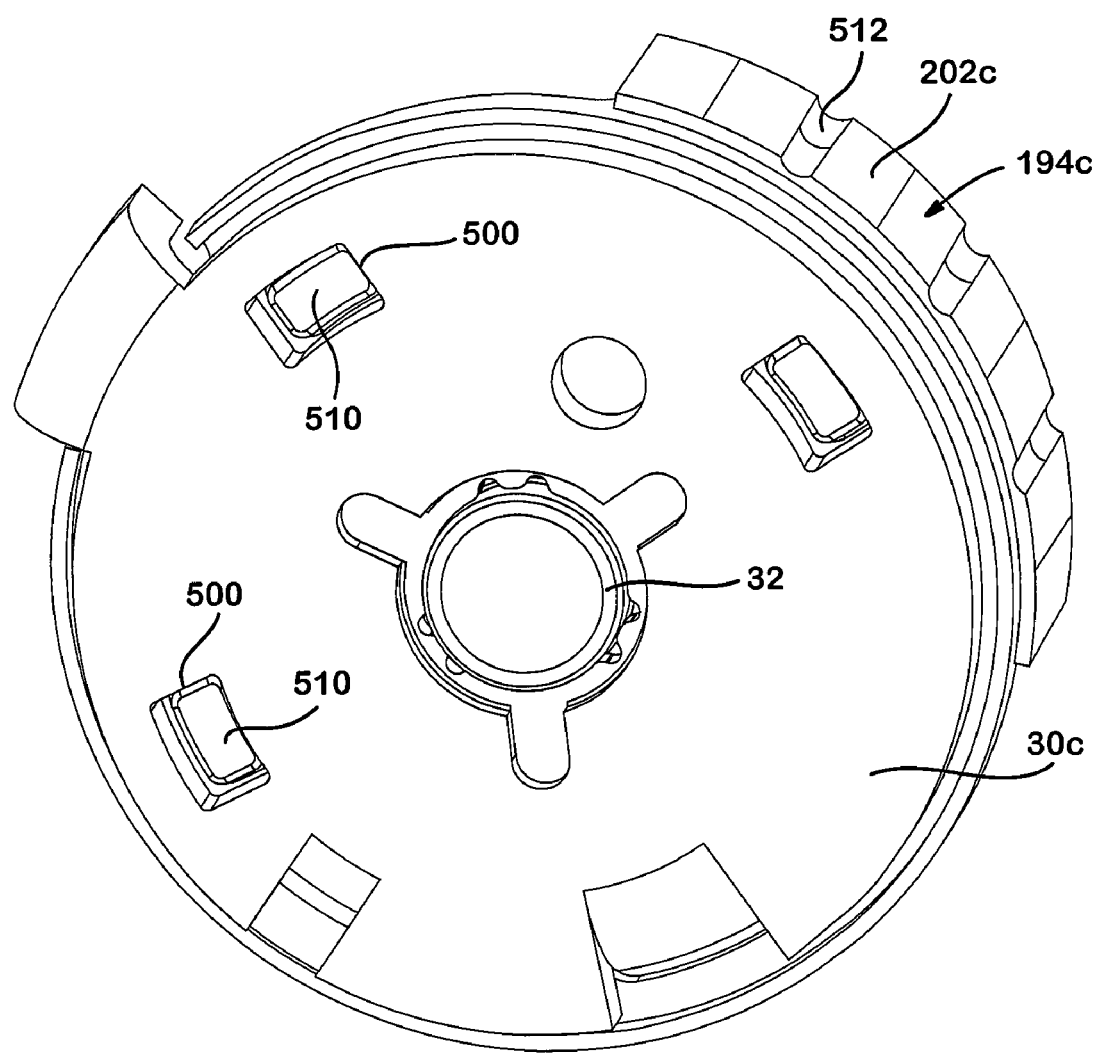
FIG. 18 is a rear perspective view of the portion of the tensioner assembly illustrated in FIG. 17.
Figure 19:
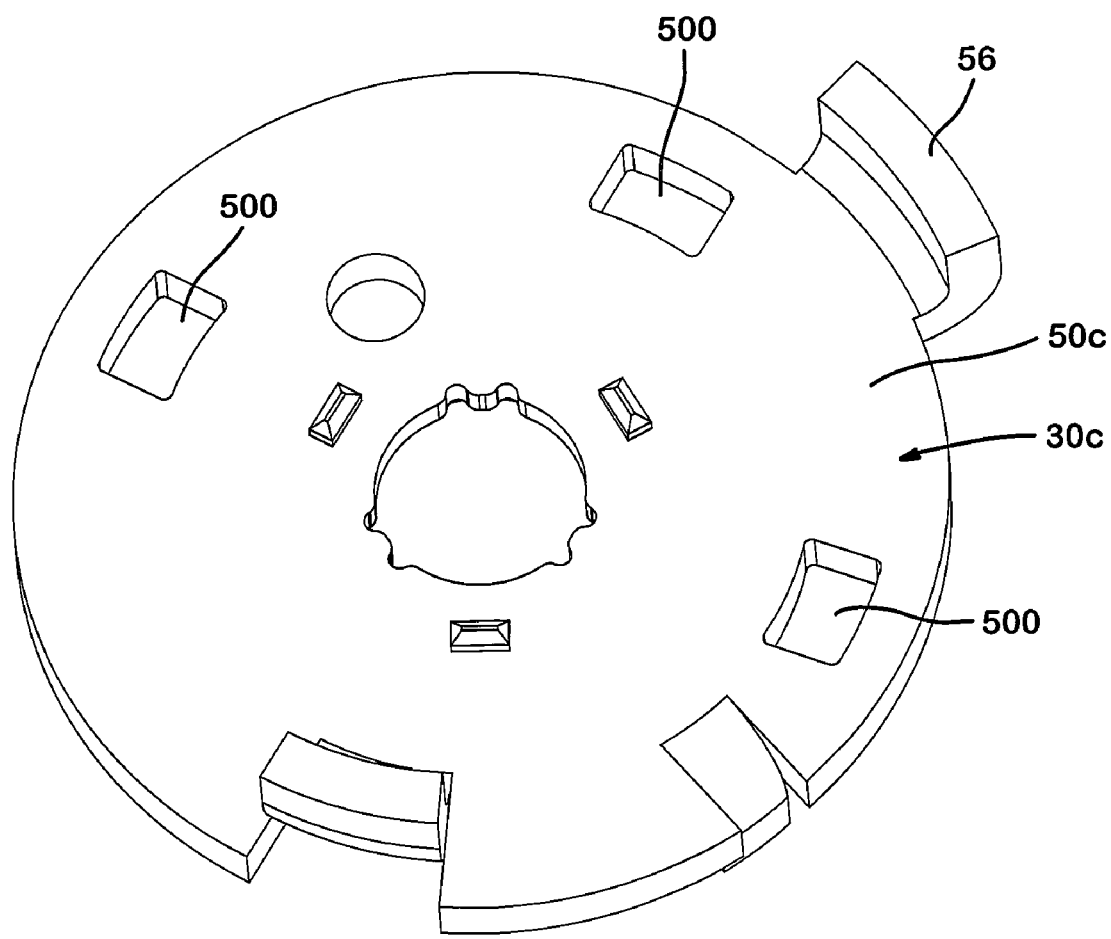
FIG. 19 is a top perspective view of a portion of the tensioner assembly of FIG. 17 illustrating the rear plate in more detail.
Figure 20:
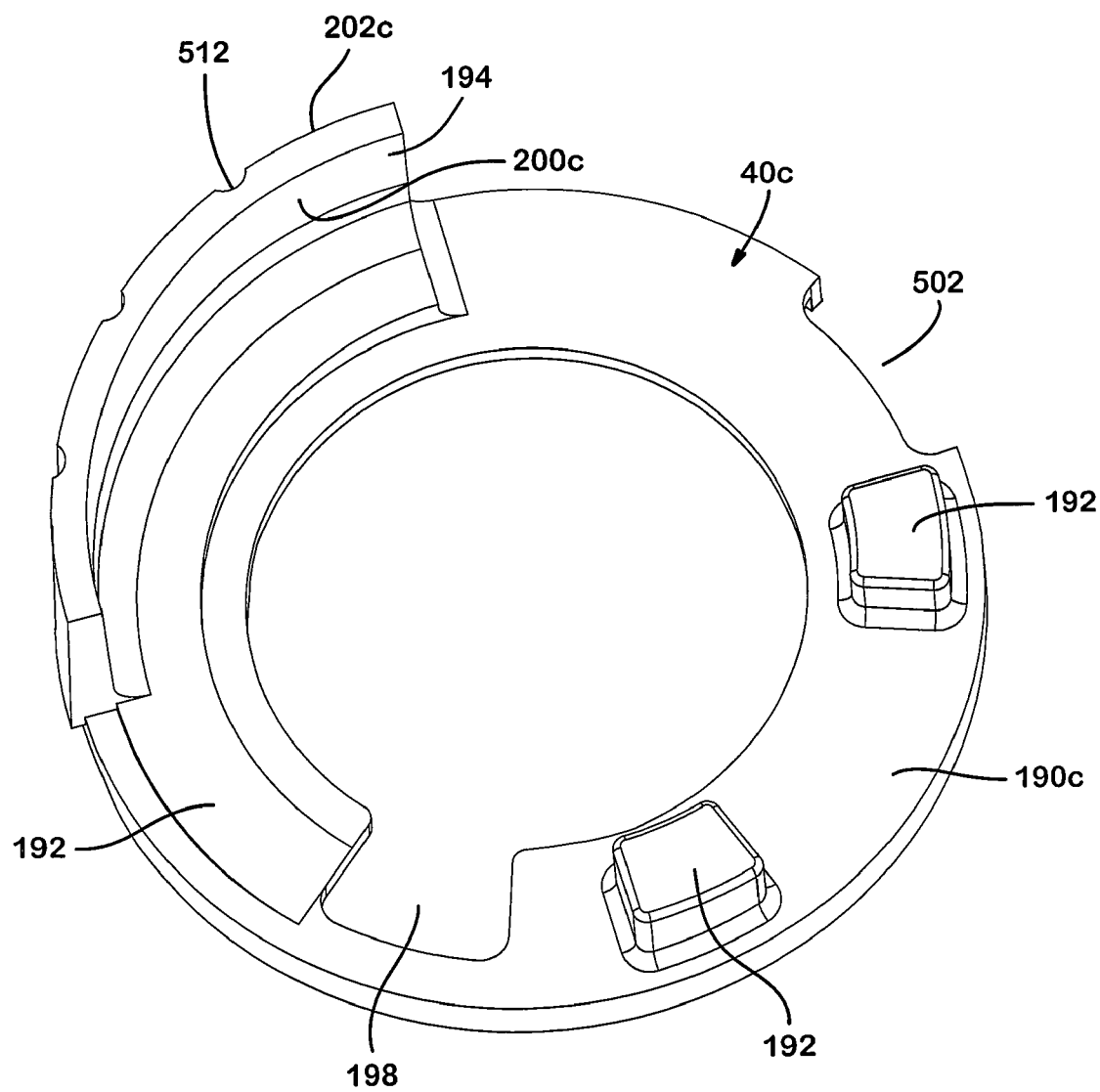
FIG. 20 is a top perspective view of a portion of the tensioner assembly of FIG. 17 illustrating the load balancing element in more detail.

In view of the foregoing, those of skill in the art will appreciate that the frustoconical outer bushing surface 92 of the pivot bushing 34 and the frustoconical mount surface 146 of the hub portion 120 of the tensioner arm 38 can cooperate to control the damping of the tensioner assembly 18 on a first basis, while the reaction flange 194 of the LBE 40 and the outer wall 132 of the hub portion 120 can cooperate to control the damping of the tensioner assembly 18 on second basis. Auxiliary damping may be tuned to a desired level through control of the surface finish of the reaction surface 140 and/or the arcuate outer face 202, the materials from which the reaction surface 140 and/or the reaction flange 194 are formed and/or the use of materials, such as lubricants, between the reaction surface 140 and the arcuate outer face 202. For example, a suitable coating 260, such as Nylon or Teflon®, could be deposited onto the outer wall 132 of the hub portion 120 and form the reaction surface 140a as shown in FIG. 15. As another example, an insert (not shown) formed of a desired material, such as Nylon or Teflon®, could be coupled to the outer wall 132 in an appropriate manner, such as an annular insert that can be press-fit onto the outer wall 132, or an insert 270 that can be received into a pocket 272 that can be formed in the outer wall 132b as shown in FIG. 16. It will be appreciated that such insert could also be coupled to the LBE 40. As yet another example, where the LBE 40 is formed of a plastic base material, various other materials, such as glass or graphite, could be incorporated into the LBE 40 (or portions thereof) to provide desired friction characteristics.

While load balancing element 40 has been illustrated and described as being unitarily formed of an appropriate plastic material, those of skill in the art will appreciate that the teachings of the present disclosure are sufficiently broad so as to include a composite construction. For example, it may be of benefit to line a portion of the reaction flange 194 with a material, such as sheet steel, that can form the arcuate inner surface 200 against which the torsion spring 42 can react. It will also be appreciated that while the reaction flange 194 has been described as being contacted by a first one of the coils 210a, the reaction flange 194 could be taller so as to engage two or more of the coils 210.

With reference to FIGS. 17 through 20, a portion of another tensioner assembly constructed in accordance with the teachings of the present disclosure is illustrated. It will be appreciated that while only the rear plate 30c, the shaft 32, and the LBE 40c are shown, the other components of the tensioner assembly can be similar to those which are described above in conjunction with the example of FIG. 2. The rear plate 30c can include a plurality of locating features, such as apertures 500 (FIG. 19) that can be formed through the back member 50c. The LBE 40c can include an annular body 190c that can include a first notch 198, which is configured to be received about the spring reaction member 54 (FIG. 19), and a second notch 502 that is configured to be received about the arm stop member 56. A plurality of rearwardly extending tabs 510 can be coupled to the annular body 190c and can be received into the apertures 500 in the back member 50c. In the example provided, the radially outwardly directed force applied by the torsion spring 42 (FIG. 3) to the reaction flange 194c can cause the reaction flange 194c to deflect radially outwardly such that the arcuate outer face 202c can contact the reaction surface 140 (FIG. 14) on the tensioner arm 38 (FIG. 3). It will be appreciated that the apertures 500 and the rearwardly extending tabs 510 can be sized to permit movement of the LBE 40c in a desired direction but to prohibit movement in other directions. Grooves 512 can be formed in the arcuate outer surface 202c to permit debris to pass by the interface between the tensioner arm 38 (FIG. 3) and the reaction flange 194c. While the body 190c has been illustrated as having an annular shape, it will be appreciated that a slit can be formed through the body 190c (e.g., radially in-line with the arm stop member 56) to permit the LBE 40c to more readily deflect in response to the radially outwardly directed force of the torsion spring 42 (FIG. 3).

The one or more second anti-rotation features 96 can cooperate with the one or more first anti-rotation features 80 to inhibit rotation of the pivot bushing 34 relative to the shaft 32. Where the one or more first anti-rotation features 80 include a non-circular cross-sectional shape of the outer peripheral surface 78, the one or more second anti-rotation features 96 can include a corresponding or mating shape of the inner bushing surface 94 In the particular example provided, the one or more second anti-rotation features 96 comprise a plurality of inwardly extending tabs 104 that are configured to be received into the longitudinally extending grooves 82 in the body 72 of the shaft 32.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A tensioner assembly for tensioning an endless power transmitting element, the tensioner assembly comprising:
   a base plate;
   a shaft having a first end mounted to the base plate;
   a pivot bushing that is slidable on the shaft;
   a tensioner arm including a hub portion, a mount and an arm, the hub portion being coupled to a first end of the arm, the mount being coupled to a second end of the arm, the hub portion engaging the pivot bushing;
   a torsion spring having a first end, a second end and a plurality of coils, the first end engaging the base plate and the second end biasing the tensioner arm in a predetermined direction relative to the base plate;
   a driven member coupled to the mount of the tensioner arm; and
   a load balancing element disposed between an interior surface of the hub portion and the torsion spring, the load balancing element being driven radially outwardly against the hub portion by at least one of the coils of the torsion spring at a predetermined location to transmit a radially outwardly directed force, which is generated by the torsion spring, to the hub.

2. The tensioner assembly of claim 1, wherein the load balancing element is generally C-shaped.

3. The tensioner assembly of claim 2, wherein the load balancing element and the base plate are non-rotatably coupled to one another.

4. The tensioner assembly of claim 3, wherein one of the load balancing element and the base plate includes an aperture and the other one of the load balancing element and the base plate includes a member that is received into the aperture.

5. The tensioner assembly of claim 1, wherein the load balancing element includes a reaction flange with an arcuate inner face, which is configured to abut at least one of the plurality of coils, and an arcuate outer face that is configured to abut the interior surface of the hub portion at the predetermined location.

6. The tensioner assembly of claim 5, wherein the load balancing element further includes a spring support lug that contacts a bottom surface of one of the plurality of coils.

7. The tensioner assembly of claim 1, wherein the mount is coupled to the arm on a side opposite the hub portion such that the drive member is offset from the pivot bushing.

8. The tensioner assembly of claim 1, wherein the pivot bushing includes a frustoconical outer bearing surface that engages a frustoconical bearing mount surface formed on the tensioner arm.

9. The tensioner assembly of claim 8, further comprising a damping spring biasing the pivot bushing along the shaft away from the base plate.

10. The tensioner assembly of claim 9, wherein the shaft includes at least one first anti-rotation feature and the pivot bushing includes at least one second anti-rotation feature, the first and second anti-rotation features engaging one another to inhibit relative rotation between the pivot bushing and the shaft.

11. The tensioner assembly of claim 10, wherein the at least one first anti-rotation feature comprises a cruciform cross-sectional shape of the shaft.

12. The tensioner assembly of claim 1, wherein the hub portion includes a wall member and a coating that is disposed on the wall member at the predetermined location such that the load balancing element contacts the coating.

13. The tensioner assembly of claim 12, wherein the hub portion includes a wall member and an insert that is coupled to the wall member such that the load balancing element contacts the insert.

14. A tensioner assembly for tensioning an endless power transmitting element, the tensioner assembly comprising:
a drive member;
a tensioner arm with a hub portion, an arm and a drive member mount, the drive member being coupled to the drive member mount on a side of the arm opposite the hub portion such that the tensioner assembly has a drive member-over-arm configuration;
a shaft mounted coaxially within the hub portion;
a pivot bushing having a frustoconical bearing surface, the pivot bushing being slidably mounted on the shaft, the frustoconical bearing surface engaging a corresponding frustoconical surface in the hub portion;
a torsion spring received between the shaft and an outer wall of the hub portion, the torsion spring biasing the tensioner arm about the shaft in a predetermined rotational direction; and
a load balancing element received between the outer wall of the hub portion and the torsion spring, the load balancing element abutting the outer wall and the torsion spring to transmit a radially outwardly directed force generated by the torsion spring to the outer wall at a predetermined location.

15. The tensioner assembly of claim 14, wherein the load balancing element includes a reaction flange with an arcuate inner face, which contacts a radially outward surface of the torsion spring, and an arcuate outer face that contacts the outer wall at the predetermined location.

16. The tensioner assembly of claim 14, wherein the load balancing element is generally C-shaped.

17. The tensioner assembly of claim 16, further comprising a base plate that is non-rotatably coupled to the load balancing element.

18. The tensioner assembly of claim 17, wherein one of the load balancing element and the base plate includes an aperture and the other one of the load balancing element and the base plate includes a member that is received into the aperture.

19. The tensioner assembly of claim 14, wherein the load balancing element includes a spring support lug that contacts a bottom surface of the torsion spring.

20. A tensioner assembly for tensioning an endless power transmitting element, the tensioner assembly comprising:
a base plate;
a shaft having a first end mounted to the base plate;
a pivot bushing slidably received on the shaft, the pivot bushing having a frustoconical outer bearing surface;
a tensioner arm including a hub portion, a mount and an arm, the hub portion being coupled to a first end of the arm and including a frustoconical bearing mount surface that engages the frustoconical outer bearing surface of the pivot bushing, the mount being coupled to a second end of the arm, the hub portion engaging the pivot bushing;
a damping spring biasing the pivot bushing along the shaft away from the base plate;
a torsion spring having a first end, a second end and a plurality of coils, the first end engaging the base plate and a second end biasing the tensioner arm to bias the tensioner arm in a predetermined direction relative to the base plate; and
a driven member coupled to the mount of the tensioner arm; and
a generally C-shaped load balancing element that is non-rotatably coupled to the base plate, the load balancing element being disposed between an interior surface of the hub portion and the torsion spring, the load balancing element being driven into the hub portion at a predetermined location to transmit a radially outwardly directed force, which is generated by the torsion spring, to the hub;
wherein one of the load balancing element and the base plate includes an aperture and the other one of the load balancing element and the base plate includes a member that is received into the aperture;
wherein the load balancing element includes a reaction flange with an arcuate inner face, which is configured to abut at least one of the plurality of coils, and an arcuate outer face that is configured to abut the interior surface of the hub portion at the predetermined location;
wherein the load balancing element further includes a spring support lug that contacts a bottom surface of one of the plurality of coils;
wherein the mount is coupled to the arm on a side opposite the hub portion such that the drive member is offset from the pivot bushing; and
wherein the shaft includes at least one first anti-rotation feature and the pivot bushing includes at least one second anti-rotation feature, the first and second anti-rotation features engaging one another to inhibit relative rotation between the pivot bushing and the shaft.

* * * * *